Figure 6:
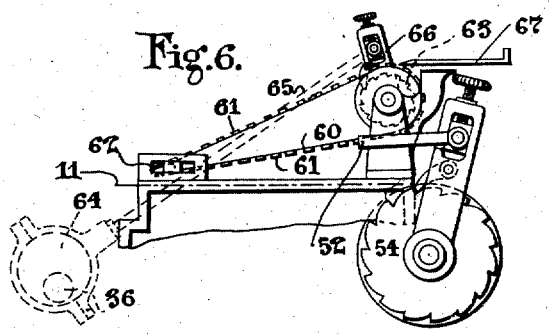

W. T. CARR.
MACHINE FOR THE MANUFACTURE OF FILLED BISCUITS AND THE LIKE.
APPLICATION FILED JAN. 5, 1912.
Reissued Feb. 13, 1912.
2 SHEETS—SHEET 1.
13,367.
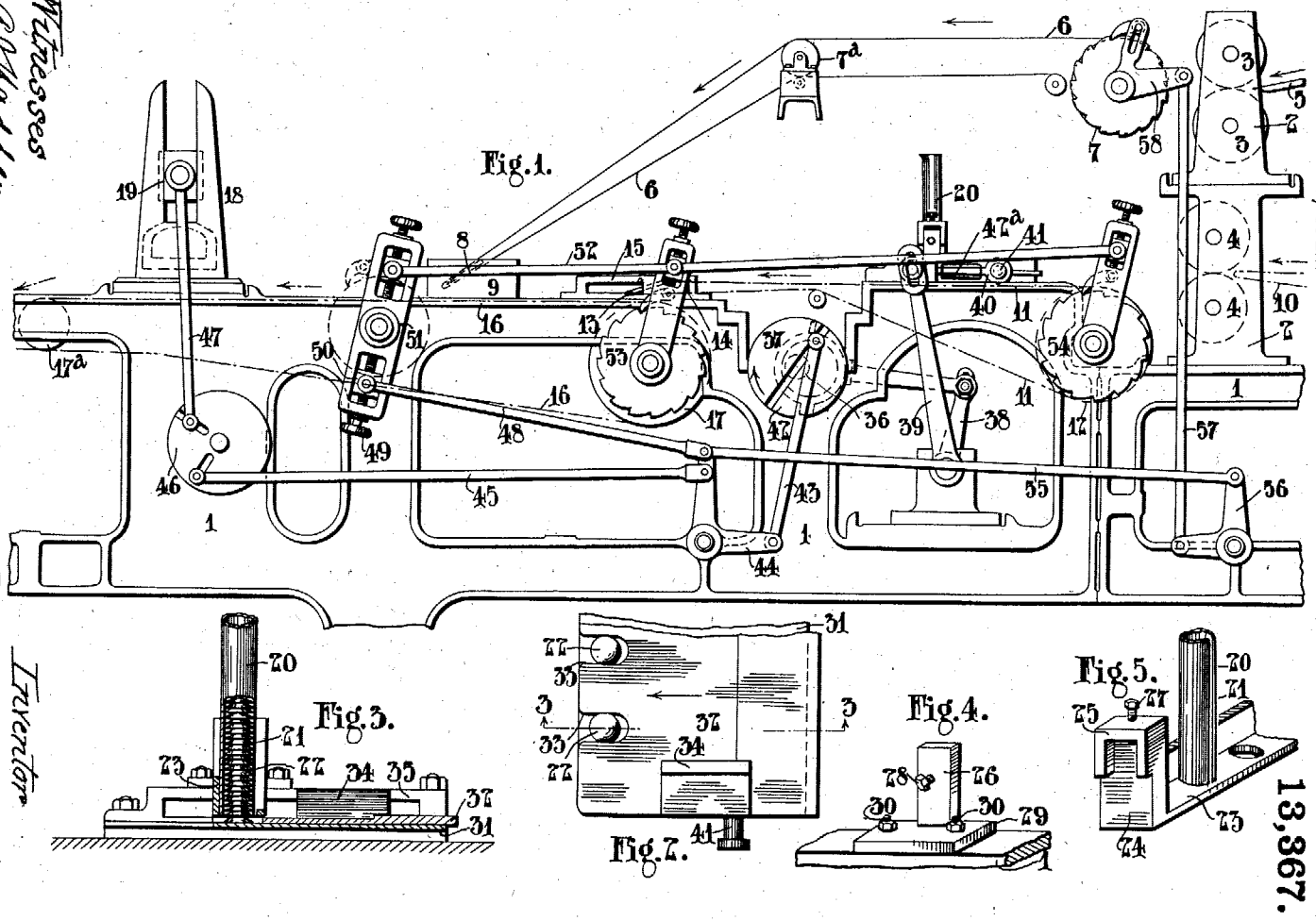
Witnesses
A. J. Madden
A. E. Hathaway
Inventor
William Theodore Carr
by his Attorney R. H. Madden
COLUMBIA PLANOGRAPH CO., WASHINGTON, D. C.

W. T. CARR.

MACHINE FOR THE MANUFACTURE OF FILLED BISCUITS AND THE LIKE.

APPLICATION FILED JAN. 5, 1912.

2 SHEETS—SHEET 2.

Reissued Feb. 13, 1912.

13,367.

Witnesses
A. J. Maldon
A. E. Hathaway

Inventor
William Theodore Carr
by his Attorney R. Hudson

COLUMBIA PLANOGRAPH CO., WASHINGTON, D. C.

UNITED STATES PATENT OFFICE.

WILLIAM THEODORE CARR, OF CARLISLE, ENGLAND, ASSIGNOR OF ONE-HALF TO CARR & COMPANY, LIMITED, OF CARLISLE, ENGLAND.

MACHINE FOR THE MANUFACTURE OF FILLED BISCUITS AND THE LIKE.

13,367. Specification of Reissued Letters Patent. Reissued Feb. 13, 1912.

Original No. 1,006,530, dated October 24, 1911, Serial No. 533,656. Application for reissue filed January 5, 1912. Serial No. 669,986.

*To all whom it may concern:*

Be it known that I, WILLIAM THEODORE CARR, a subject of the King of England, residing at Carlisle, in the county of Cumberland, in England, have invented certain new and useful Improvements in Machines for the Manufacture of Filled Biscuits and the Like, of which the following is a specification.

This invention relates to the manufacture of biscuits or similar articles of food composed of dough having an interior filling of some material other than the dough, for example fruit jelly, and the object of the invention is to enable such biscuits or articles to be made by machinery according to the cutting process without any part of the filling passing away in the waste, by which term is understood the remainder of the sheet of dough from which those parts which are to be baked as biscuits have been cut.

According to the present invention two sheets of dough traveling along paths spaced from one another are caused to converge and lie one upon the other where they pass under the cutters. In the space between the two sheets of dough where they are spaced apart, disks, pastils, drops, or the like of the fruit jelly or other filling are deposited upon the lower sheet of dough at such predetermined separate places across the width of the sheet and at intervals of time so that they lie at such predetermined intervals along the length of the sheet that when they arrive, covered by the upper sheet of dough, beneath the cutters the latter are timed to cut the sheets so that the filling lies wholly within the circumference of the cut out portion and the remainder of the double sheet of dough passes away without any of the filling in it so that it is not unsuitable to be worked up into a sheet for passage through the machine again in the usual manner in biscuit making. As it is intended that the filling shall be wholly concealed within the biscuit, the separate portions of filling are smaller in area than the area of the dough severed by the cutters and the cutters are so formed that in molding the dough they press the margins of the cut out portions of the upper sheet down upon the lower sheet around the filling.

Suitable machinery for making biscuits and the like according to this method comprises any suitable biscuit dough cutting machine designed to forward two sheets of dough to the same cutters and affording a suitable space between the aprons on which the dough sheets are forwarded, sufficient for the installation and operation of the filling feed. The latter comprises a series of separately delivering feed devices located at the proper distances apart across the machine and simultaneously operated to deposit the portions of filling on the lower sheet of dough in a line parallel with the line of the cutters and to repeat the operations at such intervals that a row of portions of filling may arrive under the cutters at each stroke of the cutter head. A convenient construction for this purpose designed to feed the fillings in the form of disks (which may have been produced by molding, cutting or pressing the filling material) consists of a row of hoppers carried by a frame capable of adjustment, a reciprocating slide plate under the hoppers and a stationary plate under the reciprocating plate. The latter is moved in conjunction with the dough sheet feed so that it pushes the disks one by one from each hopper at a predetermined moment over the edge of the stationary plate so that they fall on the upper surface of the lower sheet of dough. The device may be adjustable to and from the cutter head for accurate dropping of the disks upon the sheet of dough. A convenient construction for operating the reciprocating slide plate is an eccentric or pair of eccentrics on the main shaft of the machine connected by links to levers mounted on suitable pivots on the base of the machine and connected at or near their upper ends by detachable hook links to gudgeons on the ends of the reciprocating slide plate. These hook links are preferably adjustable in length and adjustment is also provided for the stroke of the levers.

Figure 8:
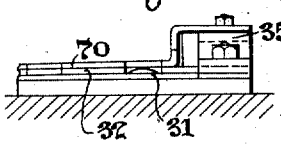
Figure 7:
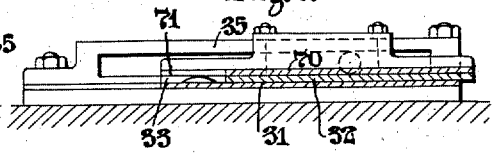
Figure 9:
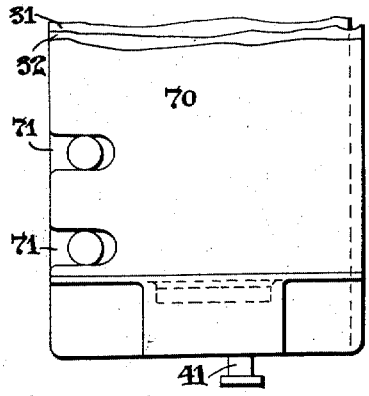

An embodiment of the machine and modifications of certain parts thereof given as an example only are illustrated in the accompanying drawings, Figure 1 being a side elevation of the complete machine; Fig. 2 a partial plan view of the reciprocating plate for feeding the fillings, Fig. 3 a section on the line 3—3 of Fig. 2 showing also a filling feed hopper and adjacent parts, Figs. 4 and 5 are detail views in perspective showing means for adjusting the filling feed mechanism. Fig. 6 is a side elevation showing alternative means for feeding the fillings and Figs. 7, 8 and 9 are respectively a sectional side elevation and end view and partial plan view of a further modification of the filling feed device.

In said drawings and referring more particularly to Figs. 1 to 5 the reference character 1 designates the main frame of the machine on which is mounted at one end the standards 2 carrying the co-acting pairs of feed rolls 3 and 4 to the upper 3 of which leads a feed board or table 5 for the upper sheet of dough which after passing through said rolls is led on to the upper dough feed conveyer 6 passing about rollers 7, 7[a] and at its lower end about a knife or roller 8 adapted to be adjusted in the slide 9 for tensioning the conveyer. To the lower pair of rolls 4 leads a conveyer 10 for feeding the lower sheet of dough which after passing through said rolls is led on to the first of the lower dough feed conveyers 11 which passes at one end about a roller 12 and at the other end around an inclined knife or roller 13 mounted in a slide 14 capable of adjustment in the guides 15. The dough passes from the conveyer 11 to a second dough feed conveyer 16 passing about rollers 17, 17[a] and extending below the cutting device 18 which has a head 19 carrying a holder for cutters or dies of any desired or approved construction.

Between the upper and lower dough conveyers is located the filling feed device comprising a number of tubular hoppers 20 open at one side as at 21 (Figs. 3 and 5) to permit the fillings 22 to be readily inserted, removed or arranged by hand. The said hoppers are carried by a transverse frame 23 mounted in the frame 1 by means of extended ends 24, each having a cap 25 adapted to fit over an abutment 26 on the frame, and capable of adjustment in a vertical direction by a screw 27 passing through the cap, and bearing on the end of the abutment and also in a lateral direction by means of another screw 28 passing through the abutment and bearing on the inside of the cap, it being understood that this arrangement is repeated at both sides of the machine. Longitudinal adjustment of the filling feed device may also be effected by forming the abutments integral with sliding plates 29 adjustable on the frame 1 by means of screws 30.

Below the hoppers 20 is located a fixed plate 31 on which is adapted to move the feed member proper for the fillings comprising a reciprocatable slide 32 bearing on said plate 31 and provided in its forward edge with recesses 33 adapted to engage the fillings 22 deposited by the hoppers on the plate 31 and to push same over the edge thereof onto the sheet of dough moving along with the conveyer 11 below said plate. The slide 32 is provided at each side with a flange or upwardly extending member 34 adapted to engage a rail or bar 35 at the side of the machine so that efficient guidance is provided.

The means for operating in unison or at the desired times the filling feed mechanism, the cutters and the dough feed conveyers may be of any desired kind, but as shown in the drawings, 36 designates the main driving shaft on which is mounted an eccentric 37 the rod of which is connected to levers 38, 39 the latter of which is pivotally attached to a link 40 engaging over a gudgeon 41 on the slide 32. The levers and links may be duplicated on the other side of the machine and the link or links may contain an adjusting turn buckle 42[a]. Adjustment of the stroke of the slide may thus be regulated and also by varying the throw of the eccentric. The shaft 36 also carries a disk 42 to which is adjustably connected a rod 43 engaging a bell crank 44 connected by rod 45 to a disk 46 the latter being connected by another rod 47 to the cutter head 19. Means of adjustment are also provided by attaching the rods 45 and 47 to the disk 46 by pin and slot or equivalent connections as shown. To the bell crank 44 is also connected another rod 48 adjustably mounted as by screw 49 and block 50 in one end of a rocking head 51 in the other end of which is similarly mounted a rod 52 adjustably connected up to two ratchet and pawl feed devices 53 and 54 (of substantially known construction) acting on the rollers 17 and 12 of the lower dough conveyers 16 and 11 respectively to positively feed same with the required intermittent movement. To the bell crank 44 is further connected one end of a rod 55 the other end of which is coupled to a bell crank 56 operating a rod 57 connected to a pawl and ratchet feed device 58 acting on the roller 7 of the upper dough conveyer to feed same with the desired intermittent movement.

It will be seen that all the parts referred to can be positively driven in unison at the desired times from the main shaft 36 and that ample provision is made for adjusting the times and strokes of the various parts so that they may efficiently coöperate to produce accurately made and finished goods.

The construction of feed device shown in Fig. 6 is particularly adapted for feeding fillings which are of too plastic a nature to be fed through the hoppers 20 previously described and this construction comprises an endless web or conveyer 60 provided with transverse spacing slats, ribs or equivalents 61, and passing at one end about a knife or roller 62 and at the other end around a roller 63 adapted to be driven intermittently from the main shaft 36 by means of the eccentric 64, rod 65 and known form of ratchet feed device 66. The fillings are placed on the shelf or feed table 67 and are passed by the operative by hand on to the web 60 between the slats 61, the web feeding them to the sheet of dough on the conveyer 11 in proper relation to the movement thereof.

The construction shown in Figs. 7 to 9 is very similar to that shown in Figs. 2 and 3 with the exception that an upper fixed plate 70 is placed over the slide 32 and provided with recesses 71 corresponding to the recesses 33 in said slide. The purpose of this additional plate is to enable the operator to place the fillings in a more or less haphazard fashion thereon and to sweep them by an easy movement of the hand one into each of the recesses whence they drop into the recesses of the slide and are fed as previously described. The plate 70 may be fixed to the guides 35 as shown in Fig. 8 and the remaining parts being similar to those shown in Figs. 2 and 3 are given similar reference characters.

For feeding liquid, semi-liquid or plastic filling material any of the well known forms of "drop" feed machines or devices may be used such as those provided with measuring pumps, slides or valves adapted to receive a charge of such material from a hopper and deliver same through nozzles or the like on the sheet of dough.

What I claim as my invention and desire to secure by Letters Patent of the United States is:—

1. A biscuit making machine comprising in combination two superposed endless conveyers for feeding sheets of dough in separate planes and subsequently bringing them into contact, means for feeding separate biscuit fillings on to the lowermost of said sheets in spaced relation thereon prior to the contact of the sheets, means for cutting biscuits from said contacting sheets of dough and means for actuating said cutting means in unison with the filling feeding means whereby said fillings will lie within the area of the cut out dough and the waste will be free from filling.

2. A biscuit making machine comprising in combination means for feeding sheets of dough in separate planes and subsequently bringing them into contact, a series of feed hoppers and a delivery mechanism coöperating with the dough sheet feeding means, whereby separate biscuit fillings are fed in the form of disks or slices on to the lower dough sheet prior to the contact of the sheets and means for cutting biscuits from the contacting sheets of dough whereby the fillings are located within the area of the cut out dough with the waste free from filling.

3. A biscuit making machine comprising in combination two superposed conveyers for feeding two sheets of dough, in separate planes and subsequently bringing them into contact, a series of feed hoppers and delivery mechanism adjustably placed in the space between the two conveyers and adapted to feed biscuit fillings in the form of disks or slices on to the lower dough sheet prior to the contact of the sheets, means for cutting biscuits from the two contacting sheets of dough whereby the fillings are located within the area of the cut out dough with the waste free from filling and means for adjusting and timing the stroke of the filling feed mechanism.

In witness whereof I have signed this specification in the presence of two witnesses.

W. THEODORE CARR.

Witnesses:
FRANK A. CARR,
W. P. NEIL.

Copies of this patent may be obtained for five cents each, by addressing the "Commissioner of Patents, Washington, D. C."